United States Patent Office 2,907,432
Patented Oct. 6, 1959

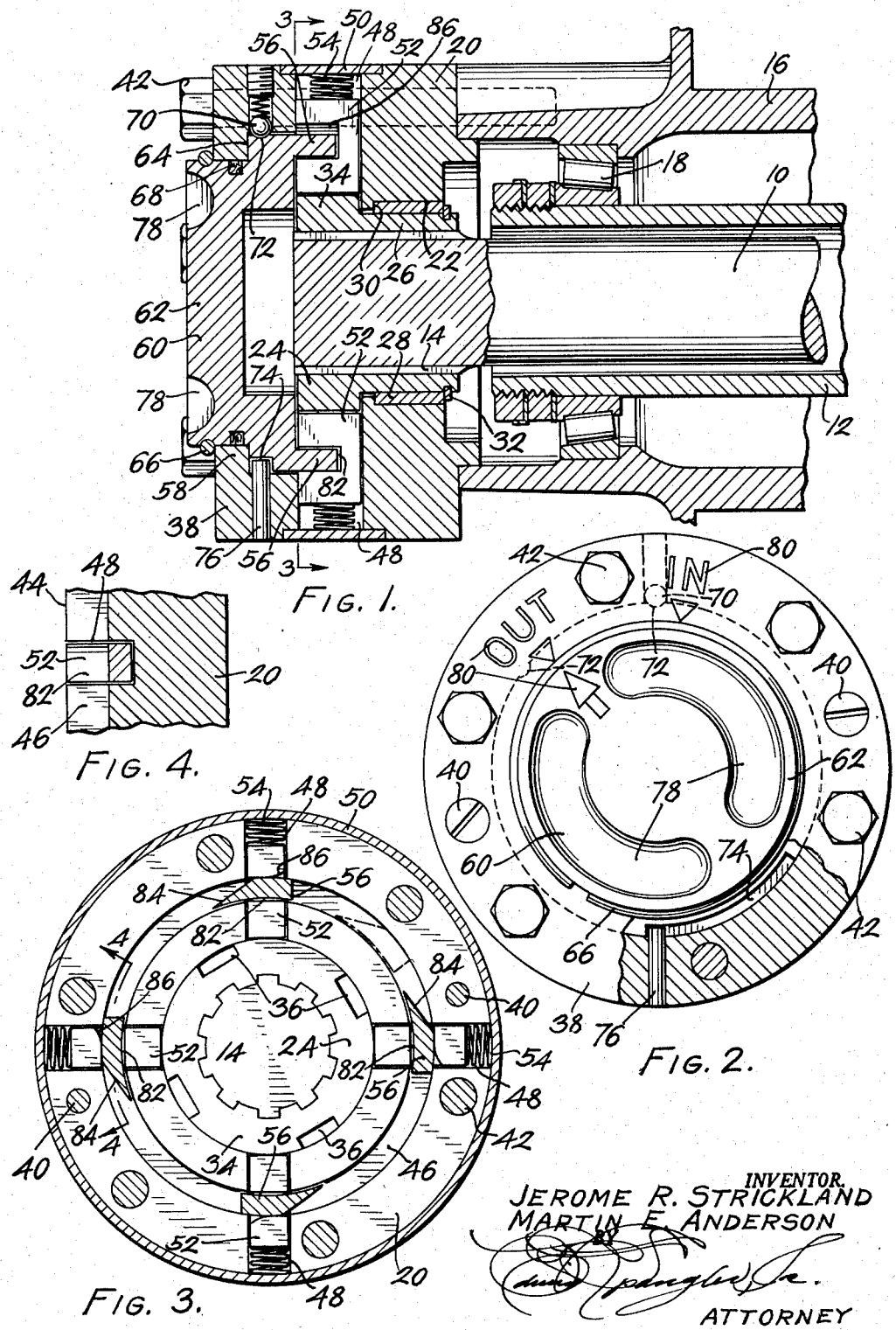

2,907,432

SELECTIVE DRIVE HUB

Jerome R. Strickland and Martin E. Anderson, Denver, Colo., assignors to Free Lock Corporation, Denver, Colo., a corporation of Colorado Application September 30, 1957, Serial No. 687,208

11 Claims. (Cl. 192—71)

This invention relates to selective drive hubs for four-wheel drive vehicles and is directed to subject matter similar to that of the copending application of Requa et al. Serial Number 515,994 now U.S. Patent No. 2,846,039 that has a common co-inventor.

The foregoing copending application discloses a selective drive hub for four-wheel drive vehicles that includes a plurality of radially movable cam-actuated pawls which move in and out of engagement with a splined member carried by the axle to produce a driving connection between the front wheels and transmission. It has now been determined, however, that the earlier hub design possessed certain inherent weaknesses that should be eliminated to improve the overall utility and functionability of the unit.

One of the most important of these disadvantages was the problem of placing the disengaged mating elements in the aligned position wherein engagement thereof would take place. An improvement to overcome this objectionable feature forms the subject matter of the copending applications of James R. Lloyd, Sr., Serial Number 608,766 and Francois A. Heck, Serial Number 678,338. Both of these applications relate to normally-operated and externally located devices for accomplishing rotational movement of the axle and the associated splined sleeve relative to the toothed pawls when the vehicle is at rest until the opposed teeth are aligned for engagement. It has now been found in accordance with the teaching of the instant invention that manual relative rotation between the mating elements of the hub is unnecessary; but, that movement of the vehicle can be used to position and engage the interlocking members in driving relation.

A second, and no less important, problem was in the design and fabrication of the pawls. In one of the constructions disclosed in the Requa et al application identified above, each pawl included a plurality of arcuately arranged teeth which had to mate with an externally splined sleeve upon radial movement of the pawl. The arcuate configuration of the mating elements coupled with the relative radial movement therebetween required teeth on the pawl of special design that had to be fabricated with highly specialized and expensive techniques, and from metals of a type not particularly noted for structural strength under the stresses to which these parts are occasionally subjected. As a result, the pawls were found to be quite costly and to break or otherwise fail under conditions of excessive loading. The present construction, on the other hand, is designed with pawls that are quite inexpensive, can be formed with conventional machining techniques, do not require close tolerances, and can be made from metals able to withstand loads far in excess of that to which they will be subjected in use.

Another problem was in the fabrication of the cam which operated to move the pawls both into and out of engagement with the splined sleeve. The dual function of the cam necessitated double cam surfaces which involved additional expense in fabrication.

Finally, the overall design of the Requa et al basic hub and the improved hubs of Lloyd and Heck was such that many parts were required, several of which were difficult and expensive to manufacture, also, close tolerances had to be maintained in the mating elements which, in addition to increased direct costs, brought about higher indirect costs due to a more involved and time-consuming assembly. The present hub eliminates these last-mentioned problems through the use of low-cost materials, common fabrication methods and the rapid assembly which is possible with loose-fitting parts.

This, therefore, is the principal object of the present invention to provide an improved and simplified selective drive hub for four-wheel drive vehicles.

A second object is to provide a selective drive hub having a simple pawl and notch interlocking arrangement that eliminates the need for mating teeth.

A third object is the provision of a pawl for use in selective drive hubs that is rugged, strong, easy and inexpensive to fabricate, and one that does not require the maintenance of tolerances beyond that attainable with common machining operations.

Another object of the invention is the provision of a selective drive member in which the interlocking elements are automatically positioned and engaged in driving relation by movement of the vehicle thus eliminating the need for manual relative rotation in order to align the mating parts prior to forming an operative coupling therebetween.

Still another object is to provide a hub for selectively connecting the front wheels of a vehicle in four-wheel drive relation that includes a simplified cam operator that functions to move the pawls between engaged and disengaged positions, and springs which automatically operate to engage the pawls in driving relation upon release of the cam operator as soon as the vehicle is moved a short distance.

An additional object of the invention is the provision of means for selectively connecting a front wheel and a front drive axle in driving relation that includes radially movable pawls subject only to shearing stresses in driving relation.

Further objects are to provide a selective drive hub which is simple and inexpensive to manufacture, assemble, service and repair; one that is compact, lightweight and decorative; and, a unit which is readily adapted for use with any of the conventional four-wheel drive vehicles.

Other objects will be in part apparent and in part pointed out specifically hereinafter in connection with the description of the drawing that follows, in which:

Figure 1 is a fragmentary diametrical section showing the selective drive hub of the present invention attached in place to the hub of a front wheel with the front drive axle disengaged therefrom;

Figure 2 is a front elevation of the hub, portions of the face plate having been broken away to expose the stop arrangement by which the movement of the cam operator are limited;

Figure 3 is a section taken along line 3—3 of Figure 1; and,

Figure 4 is a fragmentary section taken along line 4—4 of Figure 3 showing a pawl, and a radial pawl receiving slot and annular cam groove in the drive flange.

Referring now to the drawing, and in particular to Figure 1 thereof, it will be seen that numeral 10 designates a front drive axle enclosed within a tubular housing 12. The outer end of the drive axle in the particular form illustrated is provided with an external splined section 14 while the other or inner end, not shown, is journaled for relation within suitable bearings of well known design and is connected into a universal joint which permits both rotational and pivotal movement thereof so that the wheels of the vehicle may be turned as well as roll along the ground. A second axle, also not shown, connects the universal into the differential in accordance with conventional practice. The differential is, in turn, connected into a transfer case which is operatively coupled with the vehicle engine by means of a transmission that functions to rotate the front and rear wheels at the same speed when in four-wheel drive rotation. The transfer case forms the means by which the front axles are disconnected from the engine and transmission thus affecting a change from four to two-wheel drive relation and visa versa.

The wheel hub 16 is journaled for rotation on roller bearings 18 carried on the end of the axle housing 12. A drive flange 20 containing a central opening 22 is attached to the outer end of the wheel hub in a manner which will be explained later. The splined section 14 on the outer end of the axle 10 is provided with the first interlocking means of the hub which, in the specific form illustrated, comprises a tubular element 24 mounted thereon for conjoint rotation and containing a plurality of angularly spaced longitudinal grooves sized and arranged to receive and lock over the splines. The inner section 26 of the tubular element has a cylindrical outer surface that is journaled for rotation within self-lubricated bushing 28 carried with a press fit inside opening 22 of the drive flange against annular shoulder 30 formed on one side thereof. The bushing is held in place by locking ring 32 on the inner end of the tubular element. With reference now to Figures 1 and 3, it will be seen that the outer section of the tubular element 24 contains an integrally formed annular flange 34 having one or more notches 36 cut into the peripheral edge thereof. In the preferred embodiment of the invention, flange 34 is provided with a plurality of notches 36 arranged in equi-angularly spaced relation, four of which have been illustrated located 90° apart. Also, the under lines of the notches extend radially and the sides of each notch lie in spaced parallel relation on opposite sides of the under line thereof.

In Figures 1, 2 and 3 it can be seen that a face plate 38 covers the outer end of the drive flange 20 and is attached thereto by screws 40. The face plate and drive flange are, in turn, attached to the wheel hub 16 for conjoint rotation by bolts 42. The drive flange 20, in effect, forms a housing within which the tubular element 24 rotates when the hub is set for two-wheel drive and to which said tubular element is operatively connected for conjoint rotation with the hub in four-wheel drive rotation. The drive flange also houses the second interlocking means that moves radially between engaged and disengaged positions with the first interlocking means in a manner which will now be described.

Referring specifically to Figures 1, 3 and 4, it will be noted that the outer face 44 of the drive flange 20 contains a circular annular groove or track 46 intersected at angularly spaced points by radial slots 48 communicating central opening 22. These slots are preferably of the same width as the notches 36 in the tubular members and arranged in the same equi-angularly spaced relation so that they will become aligned therewith in selected relative rotational positions. In the form illustrated, slots 48 also open through the peripheral edge of the drive flange where they are covered by a ring 50 of greater width than the depth of the slots to provide a grease-tight seal along the edges which overlap the flange and face plate. The slots are of greater depth than the annular groove 46 as is shown most clearly in Figure 4.

The second interlocking means comprises a pawl 52 mounted with a free-sliding fit for radial movement within each slot 48. Spring means 54, shown in the form of coiled compression springs, are mounted in each slot between the ring 50 and pawl urging the inner end thereof against the periphery of flange 34 of the tubular member which contains the notches 36, thus, pawls 52 automatically snap into notches 36 under the action of the compression springs at any time the slots become aligned with the notches due to relative rotational movement between the drive flange and axle or tubular element unless held in disengaged position by the cams 56 which will be described presently.

Several important features are worthy of note at this point with regard to the manner in which the pawls become engaged in the notches of the tubular element even though not aligned therewith if the cam is inoperative to hold the pawls in disengaged position. First of all, with the transfer case actuated in a manner to place the vehicle in four-wheel drive, it is assumed that the front and rear axles will rotate at exactly the same speed. It is seldom true, however, that the front wheels will rotate at exactly the same speed as the rear wheels due to small differences in diameter of the tires caused by unequal tread wear. As a result, there will be a small amount of relative rotation between the drive axle and tubular element coupled thereto with respect to the front wheel, drive flange, slots and pawls even in straight line driving. Thus, the pawls will rotate either slower or faster than the notches until they come into alignment therewith at which time interlocking engagement therebetween to form a driving connection will take place. Even assuming the relatively rare situation in which the front axle and wheel are rotating at exactly the same speed during straight line driving so that there is no relative motion therebetween, as soon as the front wheels are turned, the wheel on the inside of the turn runs slower and the outside wheel faster than the unloaded front axles causing almost immediate engagement of the pawls in the notches. Also, as soon as one wheel becomes engaged, its drive axle will act through the differential to produce relative rotary motion between the other front wheel and its axle until the pawls and noches are aligned for the driving connection. It is important to note in this connection that both the front wheels and axles are turning the same direction and at almost the same speed when in four-wheel drive which means that the relative rotary motion therebetween is very slight thus allowing the pawls to slip easily into place.

If, on the other hand, the front drive axles are disconnected at the transfer case to place the vehicle in two-wheel drive and the cams are moved to a position where the pawls are free to engage, the first few inches of movement of the front wheels over the ground will produce the required relative movement to align the pawls and notches. Of course, in the four pawl and notch construction shown herein, the maximum the wheel should be able to turn is a quarter of a revolution before the pawls engage. Obviously, insufficient speed could be attained in this short distance to damage the pawls as they pass over the notches.

As a practical matter, of course, there is always relative motion between the front axles and wheels when disengaged even in straight line driving which causes almost immediate alignment of the pawls and notches. In certain rare situations it is possible, however, to produce a high degree of relative motion between the front axles and disengaged front wheels when the pawls are free to engage. This could occur by skidding the rear wheels rapidly on gravel or ice with the vehicle in four-wheel drive. It has been found, however, that the pawls do not break; but rather, they begin to chatter and do not fall into the notches until the relative motion is reduced.

Finally, it will be seen that with the pawls engaged within the notches, the pawls are subjected to simple shearing stresses that they are easily able to withstand without failure. The parallel sides of the pawls and notches extending in spaced parallel relation to radial center lines produce substantially no forces tending to back the pawls out of the notches.

With reference now to all the figures of the drawing, it will be seen that face plate 38 contains a central opening bounded by an annular flange 58. The cam operator or lock control 60 comprises a disk-like element having a cylindrical projection of reduced diameter 62 on the outer surface thereof mounted for rotation within the central opening in the face plate. An annular shoulder 64 on the lock control engages the inside of the annular flange of the face plate; whereas, a lock ring 66 on the cylindrical projection 62 engages the outside of flange 58. An oil seal or packing 68 is preferably provided between the lock control and face plate, as shown. A spring-pressed ball detent 70 is provided in the face plate positioned to move into cup-like depressions 72 in the periphery of the lock control corresponding to the engaged and disengaged positions of the cams 56. The cam operator or lock control also includes an arcuate slot 74 arranged to receive pin 76 in the face plate that functions to limit the relative rotational movement of the lock control between engaged and disengaged positions of the cam. Finger holds 78 are provided in the face of the lock control along with markings 80 indicating the position of the cam.

Again with reference to Figures 1, 3 and 4, it will be noted that each pawl 52 contains a slot 82 arranged to align with the annular groove 46 in the drive flange when the pawls are in the retracted position in which they cannot engage within the notches 36 of the tubular element. The cams 56 comprise generally wedge-shaped projections on the inside face of the lock control which move arcuately within the annular track in the drive flange. Opposed cam surfaces 84 and 86 on the cams and pawls bordering the notches therein cooperate to retract the pawls when the lock control is rotated to move the cams from the dotted line position of Figure 3 to the full line position. With the cam operator or lock control retained in disengaged position by the ball detent 70, the springs 54 are, of course, compressed between the retracted pawls and ring 50. The pawls are freed for engagement by rotating the lock control clockwise in Figure 2 until the arrow lines up with the index at the "In" position which places the cams in the dotted line position of Figure 3.

Having thus described the several useful and novel features of the selective drive hub of the present invention, it will be seen that the many useful objects for which it was designed have been achieved. Although but one specific embodiment of the invention has been illustrated and described, we realize that certain changes and modifications therein many occur to those skilled in the art within the broad teaching found herein; hence, it is our intention that the scope of protection afforded hereby shall be limited only insofar as said limitations are expressly set forth in the appended claims.

What is claimed is:

1. A selective drive hub for effecting a driving connection between an end of a power shaft and a wheel hub wherein the hub encircles and is rotatably mounted on the shaft and the shaft has an end portion extending beyond an end of the hub, comprising: disk-like means forming a drive flange having an inner face adapted to be secured to said end of the hub and provided with a central opening therein through which the end portion of the shaft projects, the outer face of said disk means including at least one radial slot and a cam-receiving recess intersecting said slot; pawl means mounted in each slot for free-sliding radial movement between an extending and a retracted position, each pawl means including a transverse shoulder aligned in retracted position with the cam-receiving recess of the disk means; spring means operatively connected to each pawl means urging the same into extended position; tubular means attached to the end portion of the shaft for conjoint rotation therewith, said tubular means including at least one radial notch on the outside surface thereof sized and located to receive the pawl means in extended position when placed in radial alignment therewith by relative rotational movement between the power shaft and wheel hub; and, cam means mounted for sliding movement in the cam-receiving recess of the plate-like means between an operative and an inoperative position, said cam means including cam surface adapted to engage the shoulder of the pawl means when moved from the inoperative to the operative position to effect retraction of said pawl means against the action of the spring means thus releasing the driving connection between the power shaft and wheel hub.

2. The invention according to claim 1, wherein the disk-like means includes a plurality of radial slots arranged in equi-angularly spaced relation and the tubular means is provided with one radial notch for each slot arranged in the same spaced relation.

3. The invention according to claim 1, wherein the sides of each slot and notch are arranged in spaced substantially parallel relation equidistant on opposite sides of a radial center line.

4. The invention according to claim 1, wherein means are provided for releasably locking the cam means in inoperative and operative positions.

5. The invention according to claim 1, wherein the cam-receiving recess comprises an arcuate groove disposed concentrically about the axis of the power shaft.

6. The invention according to claim 1, wherein the shoulder of the pawl means is formed by a transverse slot therein located in alignment with the cam-receiving recess when said pawl means is in retracted position.

7. The invention according to claim 1, wherein a face plate having a central opening therein is attached to the interface of the disk-like means, and the cam means comprises a cylindrical member mounted for rotation within the central opening of the face plate, said cylindrical member including a cam projecting from the inner end thereof into the cam-receiving recess.

8. The invention according to claim 2, wherein the cam-receiving recess comprises an arcuate slot disposed in concentric relation about the axis of the power shaft.

9. The invention according to claim 2, wherein the cam-receiving recess comprises an annular track arranged concentrically about the axis of the power shaft, a face plate having a central opening therein is attached to the outer face of the disk-like means, and the cam means comprises a cylindrical member mounted for rotation within the central opening in the face plate, said member having cams projecting into the annular track for movement upon rotation of said cylindrical member into contact with the shoulder of each pawl means to accomplish simultaneous retraction thereof.

10. The invention according to claim 2, wherein the sides of each slot, notch and pawl means lie in spaced substantially parallel relation on opposite sides of a radial center line.

11. The invention according to claim 2, wherein the shoulder of each pawl means is inclined to provide a cam surface positioned to engage on oppositely inclined cam surface on each cam means when said cam means is moved into operative position.

References Cited in the file of this patent

UNITED STATES PATENTS

| | | |
|---|---|---|
| 209,712 | Pratt | Nov. 5, 1878 |
| 283,459 | Bapple | Aug. 21, 1883 |
| 449,383 | Rathbun | Mar. 31, 1891 |
| 831,745 | Rice | Sept. 25, 1906 |
| 865,302 | Hanson | Sept. 3, 1907 |
| 1,765,695 | Owens | June 24, 1930 |
| 2,647,600 | Anderson | Aug. 4, 1953 |
| 2,727,402 | Opocensky | Dec. 20, 1955 |